Nov. 20, 1956 R. P. HEUER 2,771,285
REGENERATOR
Filed Jan. 13, 1955 3 Sheets-Sheet 3

INVENTOR
Russell P. Heuer.
BY
ATTORNEYS

United States Patent Office 2,771,285
Patented Nov. 20, 1956

2,771,285

REGENERATOR

Russell Pearce Heuer, Villanova, Pa., assignor to General Refractories Company, a corporation of Pennsylvania Application January 13, 1955, Serial No. 481,684

2 Claims. (Cl. 263—15)

The present invention relates to regenerators especially for reverberatory metallurgical furnaces, and particularly to open hearth regenerators including checkers.

The present application is a continuation-in-part of my copending application Serial No. 226,484, filed May 15, 1951, for Regenerator, now abandoned.

A purpose of the invention is to obtain greater preheat in the air coming to a reverberatory metallurgical furnace or the like through a regenerator, especially by increasing the heat absorption of the regenerator.

A further purpose is to avoid clogging of a non-acid refractory regenerator by flue dust which sinters to itself, by passing the flue gases down through a non-acid refractory downcomer, then through an unobstructed non-acid refractory slag pocket, and then immediately through non-acid refractory flues free from horizontal surfaces on which flue dust could collect and sinter, before introducing the flue gases into flues having fireclay or silica insides, so that the flue gases will be cooled below the temperature at which the flue dust will exert the most aggravated attack on the fireclay or silica refractory before it encounters the fireclay or silica refractory, and will be cooled below the temperature at which the flue dust exerts a pronounced tendency to clog the flues by sintering to itself before it enters horizontal surfaces in the regenerator.

A further purpose is to increase the maximum temperature attained in a regenerator.

A further purpose is to avoid the creation of fluid slag in a regenerator and to reduce the corrosive attack of the flue gas on the refractory of the regenerator.

A further purpose is to obtain improved contact between the flue gases and the heat absorbing refractory of a regenerator, without increasing the fluid friction.

A further purpose is to make some or all of the refractory housing walls and the heat absorber in a regenerator of non-acid and suitably basic refractory.

A further purpose is to introduce the flue gases from the downtake into the regenerator through non-acid refractory walls before the gases are allowed to contact silica or clay brick.

A further purpose is to position a multi-flue non-acid refractory heat absorber in the path of the flue gases ahead of clay checkers.

A further purpose is to make the regenerator housing in two parts, the part first encountered by the flue gases being of non-acid refractory brick and the part later encountered being of fireclay or silica brick.

A further purpose is to position a non-acid refractory curtain wall at the bottom of the downtake and closely adjacent but ahead of a non-acid refractory checker wall, preferably interposing a multiple-flue vertical pass non-acid refractory between the two walls.

A further purpose is to provide a non-acid refractory heat absorber having multiple vertical passes in advance of the usual fire clay checkers, and to restrict heat losses from the non-acid refractory heat absorber and thus enable it to operate at higher temperatures by limiting the ratio of the total horizontal cross sectional area of the flues in the heat absorber to the horizontal cross sectional area of the hearth to between 0.010 and 0.060, and preferably between 0.020 and 0.045.

Further purposes appear in the specification and in the claims.

In the drawings I have chosen to illustrate one only of the numerous embodiments in which my invention appears, selecting the form shown from the standpoints of convenience in illustration, satisfactory operation and clear demonstration of the principles involved.

Figure 1:
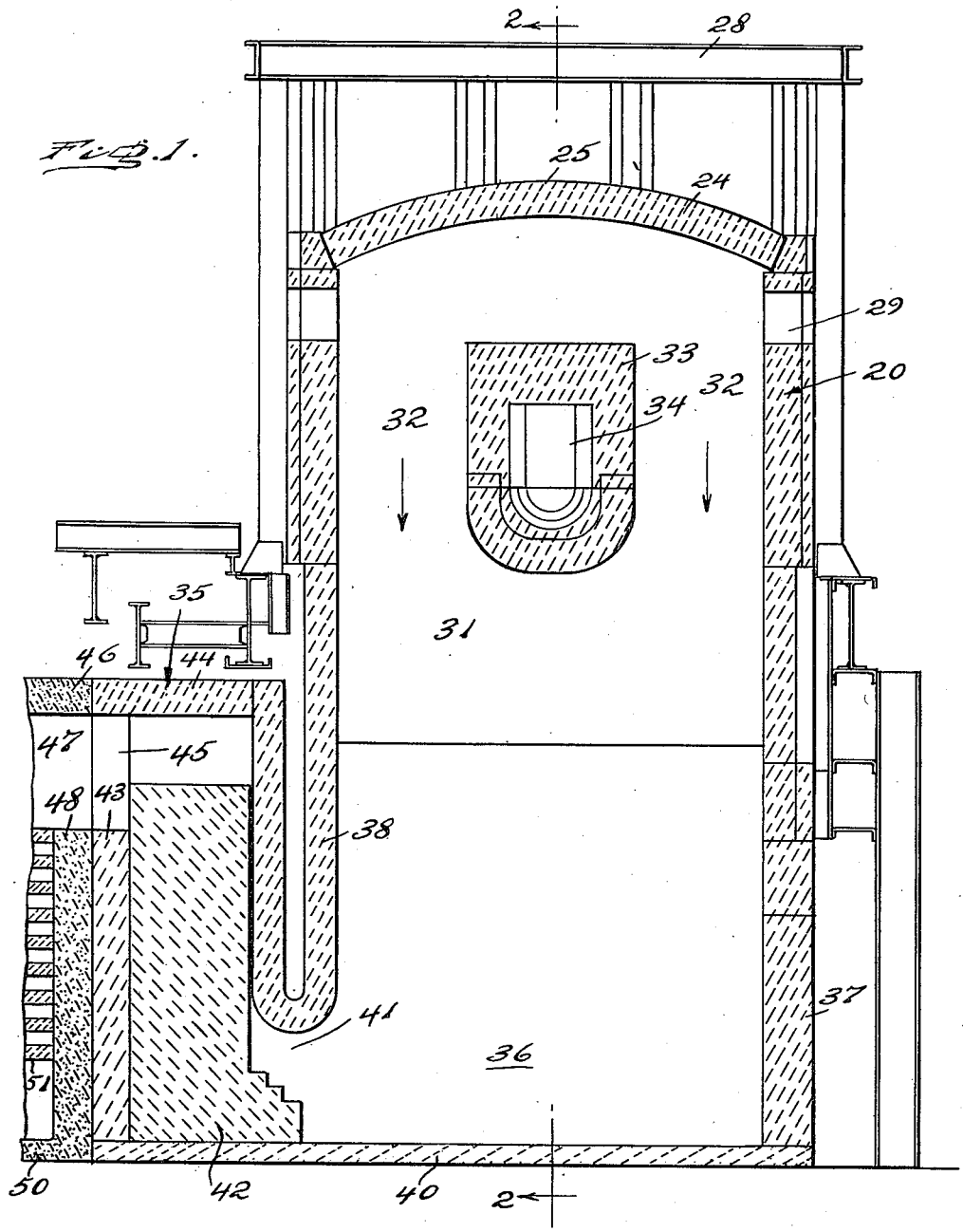
Figure 1 is a fragmentary vertical transverse section of the end of an open hearth furnace and the regenerator in accordance with the invention, the section being taken on the line 1—1 of Figure 2.

Describing in illustration but not in limitation and referring to the drawings:

In many metallurgical reverberatory furnaces, especially open hearth steel furnaces, the heat leaving the furnace in the flue gases is absorbed in refractory regenerators, and after a regenerator becomes sufficiently hot the direction of inlet and outlet are reversed and the inlet air is passed through the heated regenerator to preheat the inlet air. In the prior practice, the refractory housing of the regenerators has normally been made of silica or clay brick and the checker work has been made of refractory clay such as fireclay.

Several difficulties have developed from the use of such prior art regenerators. Dusts are carried by the flue gases which are frequently corrosive to silica or clay brick and unless the temperature of the regenerators is restricted, such dusts attack the regenerators forming slags which flow down the walls, causing eventual destruction of the regenerators and tending to clog up the slag pocket and requiring frequent attention.

The heat absorption by the silica or clay brick and by the clay checkers is limited, so that undue time is required to preheat the checkers, and the flue gases leave the checkers at an unduly high temperature, retaining considerable heat to be absorbed in waste heat boilers and the like.

Efforts have also been made in the past to employ basic refractory regenerators. These were unsuccessful because flue dust collected in the first flue pass and sintered to itself, clogging the flues. In retrospect it has been observed that the first regenerator pass where this clogging occurred had horizontal surfaces.

In accordance with the present invention, destruction of the regenerator by the corrosion of the flue gases is minimized, the operating temperature permissible in the regenerator is increased, and the heat absorption by a particular regenerator is greatly increased.

The refractory parts encountered by the flue gases as they enter the regenerator are constructed of non-acid refractory brick, rather than silica or fireclay as in previous practice. The heat is first absorbed from the flue gases by the non-acid refractory housing and by non-acid refractory heat absorbers. At a later point the flue gases are desirably passed through fireclay checkers.

A non-acid refractory curtain wall is positioned at the bottom of the downtake and a non-acid refractory checker wall is placed beyond but adjacent to the curtain wall in the direction of the flue gas progression. Between the curtain wall and the checker wall a multiple-flue vertical pass non-acid refractory heat absorber is located in the path of the flue gases.

In accordance with the invention the first pass of the regenerator is a vertical pass or set of flues arranged side by side, entering at the bottom from the unobstructed slag pocket at the bottom of the downcomer, and discharging at the top to subsequent passes of the regenerator, which may permissibly be and generally will be lined with fireclay or silica refractory. The downcomer and the slag pocket will themselves be of non-acid refractory. By this construction the flue gases are cooled in the first regenerator pass to a temperature sufficiently low to prevent aggravated attack by the flue dust on the fireclay or silica refractory in further passes. As there are no horizontal surfaces in the first pass, the flue gases are cooled to a temperature sufficiently low to eliminate any pronounced tendency of the flue dust to sinter to itself before the flue dust encounters horizontal surfaces. It will be understood of course that the tendency to cause damage by clogging if the flue gas sinters to itself in the regenerator passes is much more marked than any corresponding tendency which could exist in short horizontal portions of the gas conducting walls prior to the regenerator, because the regenerator passages or flues are normally much more restricted than passages in the downcomer and at the bottom of the slag pocket.

It is very desirable to restrict the heat losses from the heat absorber to other parts of the regenerator and to the surrounding area. With this purpose in view I find it very desirable to pass the flue gases through the flues of the heat absorber with considerable kinetic energy and destrict the flue cross sections, desirably employing much smaller total flue cross sections in the heat absorber than in the checkers and subsequent portions of the regenerator toward the outlet of the flue gases. I find that the total horizontal cross sectional area of the flues in a single pass in the heat absorber should have a ratio to the horizontal area of the hearth of between 0.010 and 0.060 and preferably between 0.020 and 0.045. The horizontal area of the hearth is measured at the foreplate level of the furnace as well known.

I find this total flue cross section in the heat absorber to be particularly desirable where the ratio of the total horizontal cross sectional area of the downtake passages (later designated 32) to the total horizontal area of the hearth is between 0.010 and 0.045, in order to create more gradual mixing of fuel and air at the burner and in accordance with the principles of the Bartu patent application later referred to.

By these improvements the tendency of corrosive flue gases to destroy the regenerator and create streams of fluid slag flowing down the inside wall of the regenerator is avoided, the flue gases merely depositing dust in the slag pocket without destroying the non-acid refractory.

In refractory of the character under discussion, the specific heat is substantially a function of weight. As a non-acid refractory has a weight per cubic foot of about one and one-half times that of a silica or fire clay refractory, the heat transfer power is correspondingly about 50 percent greater and thus the ability of the non-acid refractory part of the regenerator to retain heat is correspondingly increased.

Since the corrosiveness of the flue gases has in the past limited the operating temperature of the regenerator and the flue gases are no longer corrosive in the regenerator of the present invention, it is possible to increase the temperature attained by the regenerator beyond that of a prior art regenerator. With the regenerator of the present invention, the operating temperature at each heating cycle may rise to 2600° F. or more without damage to the regenerator. It is unnecessary to heat the entire regenerator to such a high temperature. If a multiple pass construction is used only the hottest pass need operate at relatively high temperature. By making the hottest pass of non-acid refractory capable of withstanding the basic dusts present to temperatures as high as 2600° F., the regenerator becomes capable of producing a higher temperature on the preheated gas going to the furnace and thereby speeds up and improves furnace operation.

It will be evident that the higher temperature in the first pass of the regenerator is possible without damaging corrosive attack on the walls of the first pass because the walls are of non-acid refractory, and a sintering of flue dust on itself in the first pass is avoided because the first pass is vertical.

When reference is made herein to a non-acid refractory brick, it is intended to indicate a refractory such as magnesia, chromite, magnesia-chromite, or chromite-magnesia of either the fired or unfired varieties as well known in the art. Considering the specific embodiment, a metallurgical reverberatory furnace, suitably an open hearth steel furnace 20, has a hearth 21 containing a charge 22 suitably of molten metal covered by a slag, side walls 23 and a roof 24. In the particular illustration shown, the roof has a gradually upwardly sloping portion 25 adjacent each end 20' and above the interior end of the burner 27, as described in detail in Bartu U. S. application No. 209,865, filed February 7, 1951, now U. S. Patent No. 2,704,660, for Liquid Fuel Fired Open Hearth Furnaces and Process. The fuel used is preferably gas or oil. Above the hearth the roof has a portion 26 suitably flat in longitudinal section and suitably arched in transverse section. As noted in Figure 1, the portion 25 is arched in transverse section. It will be understood of course that any suitable roof construction may be employed. Supporting structure 28, suitably steel work is positioned above the roof, and may be used for suspending the same in well known manner. Access openings 29 are provided near the end of the furnace, and these may be closed by plugs not shown.

Beneath the burner and at each end of the hearth is a bridge wall 30 and beyond the bridge wall toward each end of the furnace is a downtake 31, preferably having the form described in the Bartu application above referred to and therefore consisting of two flues 32 at the corners of the furnace on either side of the burner or burners, and separated by a refractory doghouse 33. The doghouse 33 is of hollow construction having interior steel supports 34 which are open at the end of the furnace for cooling purposes, and are supported from the steel work 28.

Below and communicating with the downtake 31 is a regenerator 35 having a slag pocket 36 immediately below the downtake to which access is obtained for removal of accumulated deposit through a door 37. The slag pocket permits unobstructed flow of gases. At the bottom of the downtake at one side of the furnace I provide a suitably suspended curtain wall 38 of suspended nonacid refractory brick construction which stops short of the bottom 40 of the slag pocket, leaving an unobstructed cross flue 41 from which flue gases leave the downtake and slag pocket to continue through the regenerator. Any well known suspended wall construction may be used and as will be apparent from the showing in Figure 1 of the drawings, the wall 38 should be a double wall with an air space in between, the air space having free access at the top to the air outside of the furnace and the air passages connected thereto, but the air space being closed off at the bottom by a curved bottom portion of the double wall interconnecting the two vertical portions thereof.

Immediately beyond the curtain wall I locate a multiple-flue vertical pass nonacid refractory brick heat absorber 42. This comprises a series of nonacid refractory brick separating walls 42' breaking the gas flow up into many different small passages and providing intimate contact between the hot gases and the walls 42'. A nonacid refractory checker wall 43 rises from the bottom 40 of the regenerator to a point somewhat below the regenerator roof 44, similarly of nonacid refractory and suitably of suspended construction. The walls 42' preferably stop short of the roof leaving a flue 45 above the walls 42' and above the checker wall 43.

Figure 2:
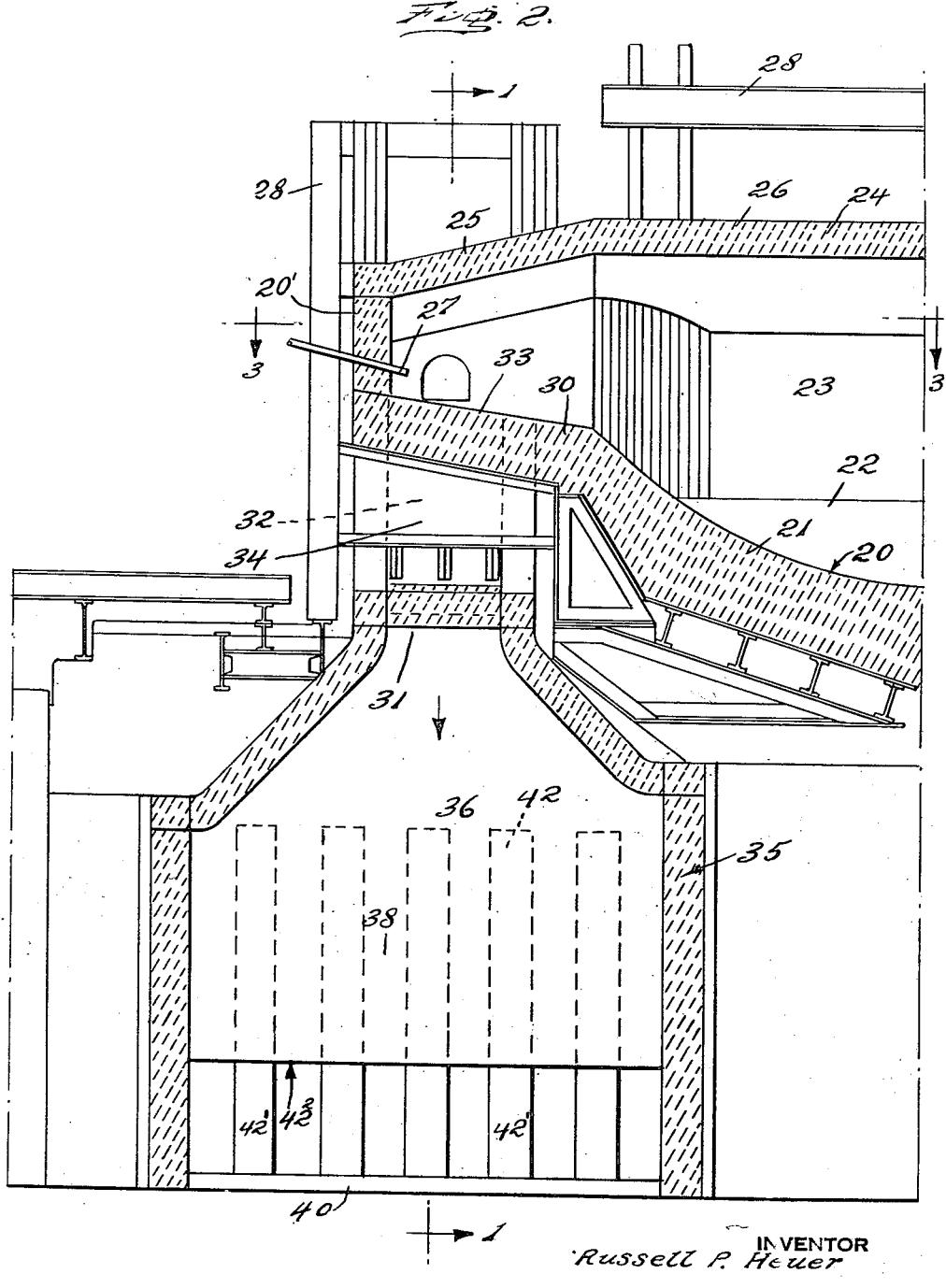
Figure 2 is a central longitudinal section of one end of an open hearth steel furnace and its regenerator, the section being taken on the line 2—2 of Figures 1 or 3.
Figure 3:
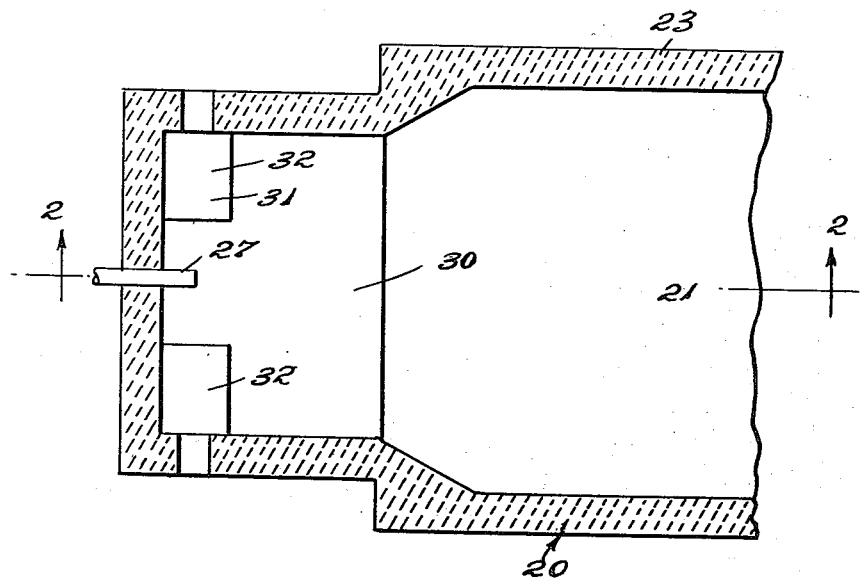
Figure 3 is a reduced scale fragmentary plan section view of an open hearth steel furnace to which the invention has been applied, the section being taken on the line 3—3 of Figure 2.

I find it very desirable to make the regenerator housing and heat absorber up to and including this point all of nonacid refractory brick such as magnesia, chrome, magnesia-chrome or chrome-magnesia. This is shown by the same character of cross sectioning on these refractory walls in Figures 1 and 2. This means that all of the housing structure at the sides and bottom of the downtake, slag pocket, curtain wall, heat absorber 42, checker wall 43 and the regenerator roof 44 is made of such non-acid refractory brick. This encounters the flue gases when they are hottest. Beyond this point I find that the regenerator can be made of fire clay or silica brick with fireclay checkers as in previous practice. Thus the roof 46 of the regenerator (suitably of suspended construction), the side wall 47 of the housing, the checker wall 48 (beyond and following the checker wall 43) and the bottom wall 50 to and including the far end of the regenerator may suitably all be of fireclay or silica brick. The multiple pass checker 51 located beyond the checker wall is suitably made of fireclay checker brick as in previous practice. This checker 51 is preferably of downflow type.

It will be evident that the total horizontal cross sectional area of the vertical flues $42^2$ in the heat absorber should be kept relatively small, and within the range which will give a ratio to the horizontal cross sectional area of the hearth of 0.010 to 0.060. This assures vigorous gas flow in the heat absorber and minimizes heat losses from the nonacid section to other parts of the regenerator.

Thus in accordance with the present invention, at the end of the furnace at which the flue gases are leaving at the moment, the flue gases pass downwardly through a downtake, under a curtain wall, and up between a checker wall and the curtain wall through a multiple-flue vertical pass heat exchanger and under a regenerator roof all of non-acid refractory brick, and then through the remainder of the regenerator housing and through a checker of usual materials, such as fireclay or silica in the housing and fireclay in the checker. When the regenerator is reversed and air is introduced at the end of the furnace at which the flue gases were previously discharged, the air passes first through the clay checkers and then through the non-acid refractory heat absorber in the non-acid refractory portion of the housing.

It will be evident that the introduction of the non-acid refractory heat absorber gives improved contact between the flue gases and the heat absorber on the heating portion of the cycle and between the air and the heat absorber on the heat-dispensing portion of the cycle.

The fact that the non-acid refractory housing and heat absorber have greater heat transfer power than the refractory previously used, makes the regenerator more efficient in absorbing and giving off heat, and reduces the time required.

The fact that the non-acid refractory in the regenerator is not susceptible to corrosive attack as in the case of silica and fireclay, makes it possible to operate at higher temperatures and with less care to protect the checker.

It will be evident that in the present invention the furnace will discharge basic flue dust in the flue gases and the flue gases carrying the basic dust will leave the furnace and enter a downtake of nonacid or basic refractory which empties vertically into a slag pocket of nonacid or basic refractory, and having at least one inlet from the combustion chamber of the furnace, a side wall portion of the slag pocket having at least one outlet for the flue gases to pass through the downtake, over the slag pocket and through the outlet in a continuous down and outward discharge sequence, and the outlet connected to a heat regenerator including a portion having refractory heat absorbing gas contacting surfaces reactive with the flue dust at temperatures somewhat below operating temperatures ordinarily maintained in said furnace, and a portion having nonacid or basic refractory heat absorbing gas contacting surfaces substantially inert to the flue dust, the refractory portion having basic refractory gas-contacting surfaces including a plurality of spaced flue elements forming vertical flues rising immediately from the outlet, the gases discharging through the downtake, over the slag pocket, through the outlet and into the flues, the flues communicating with the refractory portion having reactive refractory gas-contacting surfaces, and the refractory portion having a non-acid or basic refractory gas-contacting surfaces appreciably reducing the temperature of the flue dust to below its effective reaction temperature with the reactive refractory before the flue dust reaches the regenerator portion having reactive refractory.

In two experiments conducted at intervals of several years, efforts were made to use regenerators lined with basic refractory brick. In each case the regenerators were put out of service long before the brick had ceased to be serviceable by clogging of flue dust in the regenerator passes. The flue dust did not attack the basic refractory but sintered to itself. The analysis of the sintered flue dust from one of these experiments is as follows:

|  | Percentage by weight |
| --- | --- |
| Ignition loss | 0.00 |
| Silica | 3.44 |
| Ferric oxide | 72.97 |
| Alumina | 6.51 |
| Lime | 6.75 |
| Magnesia | 2.66 |
| Alkalies | 0.46 |
| PCE value | 20 |
| Melting point degrees F | 2786 |

It has been found in restudying these experiments where the regenerator clogged that in each case the first pass had upwardly directed horizontal surfaces, permitting the dust to collect in the first pass at a point at which the gas temperature was high enough to permit sintering the flue dust to itself. By the present invention the gas containing the flue dust in the first pass never passes over upwardly directed horizontal surfaces until the temperature has been reduced low enough so that the tendency of the flue dust to sinter to itself is no longer an appreciable factor.

The ratio of the cross section of the flues of a single pass in the multiple-flue non-acid refractory heat absorber to the cross section of the flues in the remainder of the regenerator is comparatively small, so that the loss by radiation to other parts of the regenerator from the non-acid refractory heat absorber will correspondingly be minimized.

In the regenerator of the invention there is no appreciable accumulation of fluid slag in the slag pocket, and the total volume of deposit in the slag pocket is less than in prior art practice. The slag pocket merely collects dust.

It will be evident that in accordance with the invention the efficiency of the regenerator is increased, the regenerator is made more resistant to corrosive attack, and likewise the speed of furnace operation is increased.

It will be evident that while I show nonacid heat absorbing material in the heat absorber in the form of nonacid brick walls, the nonacid refractory can be applied as any other well known form of heat absorbing filling, as used for example in checkers.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a heat regenerative system for a hearth furnace discharging basic dust in its flue gases, a downtake emptying vertically into a slag pocket and having at least one inlet from the hearth and combustion chamber of said furnace, a side wall portion of said slag pocket having at least one outlet for said flue gases to pass through said downtake, over said slag pocket and through said outlet in a continuous downward and outward discharge sequence and said downtake having a basic refractory heat absorbing wall extending upward from said outlet and a heat regenerator including a portion having refractory head absorbing gas contacting surfaces reactive with said dust at a temperature somewhat below operating temperatures ordinarily maintained in said furnace and a portion having basic refractory heat absorbing gas contacting surfaces substantially inert to said dust, said regenerator portion having basic refractory gas contacting surfaces including a plurality of spaced flue elements forming vertical flues rising immediately from said outlet, said flues having as their walls nearest the downtake, walls separated throughout most of their length from the said basic refractory wall of the downtake by an air space communicating with the air outside of said regenerative system and furnace, the gases discharging through said downtake, over said slag pocket, through said outlet and into said flues, said flues communicating with the said regenerator portion having reactive refractory gas contacting surfaces, and said regenerator portion having basic refractory gas contacting surfaces appreciably reducing the temperature of said dust to below its effective reaction temperature with said reactive refractory before said dust reaches said regenerator portion having reactive refractory.

2. A heat regenerative system according to claim 1 in which the total horizontal cross sectional area of the flues in a single pass has a ratio to the horizontal area of the hearth between 0.010 and 0.060.

References Cited in the file of this patent
UNITED STATES PATENTS

| | | |
|---|---|---|
| 1,236,140 | Blair | Aug. 7, 1917 |
| 1,393,493 | Browne | Oct. 11, 1921 |
| 1,736,415 | Niemkoff | Nov. 19, 1929 |
| 1,907,140 | Bartholomew | May 2, 1933 |
| 1,911,495 | Frank et al. | May 30, 1933 |
| 1,924,936 | Lehr | Aug. 29, 1933 |
| 1,929,073 | MacDonald | Oct. 3, 1933 |
| 2,024,595 | Petit | Dec. 17, 1935 |
| 2,548,908 | Pollen | Apr. 17, 1951 |
| 2,561,933 | Logenecker | July 24, 1951 |

FOREIGN PATENTS

| | | |
|---|---|---|
| 393,558 | Germany | Apr. 5, 1924 |

OTHER REFERENCES

Pages 47 to 58, inclusive, Iron and Steel Engineer, March 1948.

Pages 6, 7, 30 and 39, volume II, The Open-Hearth Furnace by William C. Buell, Jr., The Penton Publishing Co., Cleveland, Ohio, 1937.

Pages 147, 148 and 149, volume III, The Open-Hearth Furnace by William C. Buell, Jr., The Penton Publishing Co., Cleveland, Ohio, 1937.